(12) United States Patent
Bruington et al.

(10) Patent No.: US 6,177,775 B1
(45) Date of Patent: Jan. 23, 2001

(54) VEHICLE WIPER CONTROL SYSTEM AND METHOD

(76) Inventors: Mary C. Bruington; Mark D. Alleman, both of 8989 SW. 45th Ave., Portland, OR (US) 97219

( * ) Notice: Under 35 U.S.C. 154(b), the term of this patent shall be extended for 0 days.

(21) Appl. No.: 09/572,722

(22) Filed: May 16, 2000

(51) Int. Cl.[7] .................................................. B60S 1/08
(52) U.S. Cl. ..................... 318/443; 318/444; 318/DIG. 2; 15/250.13
(58) Field of Search ..................................... 318/443, 444, 318/DIG. 2; 15/250.001, 250.12, 250.13

(56) References Cited

U.S. PATENT DOCUMENTS 6,002,323 * 12/1999 Bomya ............................... 340/384.1

FOREIGN PATENT DOCUMENTS 4-138946 * 5/1992 (JP).

OTHER PUBLICATIONS

Compact Disc, "Volkswagen Ad, "no date.

* cited by examiner

*Primary Examiner*—Bentsu Ro
(74) *Attorney, Agent, or Firm*—Kolisch Hartwell Dickinson McCormack & Heuser

(57) ABSTRACT

A system and method for use in synchronizing a vehicle wiper to an onboard audio signal. The method typically includes detecting a tempo of the audio signal and moving the wiper based on the detected tempo of the audio signal. Typically, the wiper motion is controlled by a wiper control configured to adjust the speed and/or delay of the wiper, such that the wiper is synchronized with the detected tempo of the audio signal.

21 Claims, 6 Drawing Sheets

VEHICLE WIPER CONTROL SYSTEM AND METHOD

TECHNICAL FIELD

The present invention relates generally to vehicle wipers, and more particularly to systems and methods for controlling vehicle wipers.

BACKGROUND

Most modern vehicles contain an audio entertainment device, such as a radio or CD player, for entertaining vehicle occupants. Nearly all such vehicles also include wipers designed to clear excess water from the front windshield, thereby enabling the driver to see clearly while it is raining or the roads are wet. Typical windshield wipers periodically swipe back and forth across the windshield. When listening to music while driving in the rain, vehicle occupants often become annoyed by dissonance between the beat of the music and the rhythm of the windshield wipers.

Windshield wipers emit noise while they scrape across the windshield, which culminates in a noise burst every time the windshield wipers change direction near the edge of the windshield. These noise bursts often cause aural dissonance with music playing from the audio entertainment device. In addition, the wipers have a negative visual effect as they pass back and forth in front of the eyes of the vehicle occupants, out of sync with the music.

One recent television advertisement produced by the automobile manufacturer Volkswagen, entitled "Synchronicity," shows a couple driving a Volkswagen Jetta automobile down a street. The couple inserts a cassette tape into the cassette deck. As the rhythmic music on the cassette tape begins to play, various events surrounding the car coincidentally, even magically, begin to match the beat of the music, in an unplanned synchronicity. A basketball player dribbles to the beat. A shopkeeper sweeps to the beat. A street sign flashes to the beat. And, the windshield wipers of the Jetta wipe to the beat.

The advertisement was tremendously popular, ranking among the 10 most popular advertisements since 1995 by the USA Today Ad Track index. The advertisement demonstrates the enjoyable feeling drivers experience when windshield wipers do occasionally, randomly, acausally synchronize to the beat. The commercial does not disclose any system or method by which the beat of the music might causally affect the wiper motion. This would take away from the magic of the coincidental synchronicity shown in the commercial.

Rather, the television commercial presents a dream-like state in which, as the announcer states, "Sometimes, everything just comes together." The title of the music in the commercial is "Jung at Heart," a reference to the psychologist Carl Jung's concept of Synchronicity, in which meaning is ascribed to coincidental events that are not causally connected. Although the television commercial may present psychological meaning to viewers through the Jungian coincidental synchronicity between the wipers and music, it does not disclose or suggest any actual mechanism or method by which the wipers and music may be linked.

Thus, drivers and passengers face the problem that, although it would be pleasing to synchronize windshield wiper motion to the tempo of onboard music, currently there is no system or method capable of doing so. Therefore, it would be desirable to provide a system and method for synchronizing the motion and sound of the wipers of a vehicle with onboard audio signal.

SUMMARY OF THE INVENTION

A system and method for use in synchronizing a vehicle wiper to an onboard audio signal are provided. According to one aspect of the invention, the method includes detecting a tempo of the audio signal, and moving the wiper based on the detected tempo of the audio signal. The method may include adjusting the speed and/or delay of the wiper to synchronize the wiper motion with the detected tempo.

According to another aspect of the invention, the method includes detecting a tempo of the audio signal and moving the wiper at a first rate for an adjustment period, until movement of the wiper is synchronized with the tempo of the audio signal. The method further includes moving the wiper at a second rate for a synchronized period such that the wiper remains synchronized with the tempo of the audio signal. The first and second rates are achieved by adjusting wiper speed and/or wiper delay.

According to one aspect of the invention, the system includes an audio source configured to generate an audio signal, and a wiper control coupled to the audio source. The system further includes a wiper motor linked to the wiper control, the wiper motor being configured to rotate the vehicle wiper. The wiper control is configured to receive a detected tempo of the audio signal and signal the wiper motor to move the wiper based upon the detected tempo. The system may further include a tempo detector coupled to the audio source and to the wiper control, the tempo detector being configured to detect the tempo from the audio signal and output the tempo to the wiper control.

According to another aspect of the invention, a vehicle is provided. The vehicle includes a vehicle body including a windshield, and at least one wiper positioned adjacent the windshield. The vehicle further includes a wiper motor configured to move the wiper relative to the windshield, and an audio source coupled to the body. The audio source is configured to produce an audio signal. The vehicle further includes a wiper control configured to receive a tempo of the audio signal and signal the wiper motor to move the wiper based upon the detected tempo.

DETAILED DESCRIPTION OF THE PREFERRED EMBODIMENTS

Figure 1:
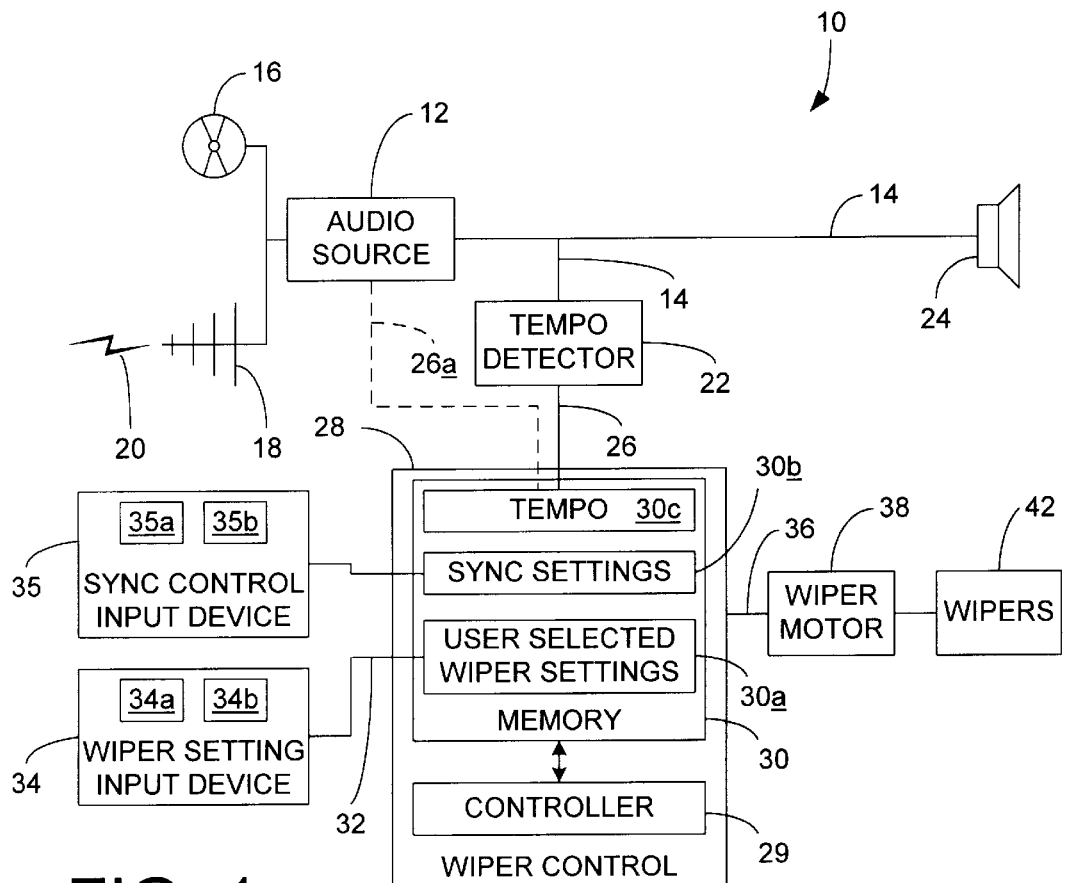
FIG. 1 is a schematic view of a system for use in synchronizing a vehicle wiper to an onboard audio signal.

Referring initially to FIG. 1, a system for use in synchronizing movement of a vehicle wiper to an onboard audio signal is shown generally at 10. System 10 typically includes an audio source 12 configured to produce an output audio signal 14. Typically, audio source 12 is a vehicle-mounted audio entertainment device including a Compact Disk (CD) player configured to read a CD 16, and/or a radio having an associated antenna 18 configured to receive a broadcast radio signal 20. Alternatively, virtually any other type of audio producing device may be used, such as a video tape player, video disk player, audio tape player, Mini Disk (MD) player, etc.

Audio output signal 14 is sent from audio source 12 to onboard speaker 24, where it is converted into audible sound for the entertainment of the occupants of the vehicle. Audio output signal 14 is typically amplified within audio source 12. Alternatively, the audio output signal may be amplified by an external amplifier coupled to the audio source 12 and speaker 24.

System 10 also typically includes a tempo detector 22 configured to receive output audio signal 14 and detect the tempo of music or other periodic sounds contained within audio signal 14, as described below. Tempo detector 22 is configured to produce an output tempo signal 26.

System 10 also typically includes a wiper control 28. The wiper control 28 is configured to receive a tempo 30*c* via tempo signal 26 from tempo detector 22, as well as a user selected wiper setting 30*a* via wiper setting signal 32 from user input device 34. In response, wiper control 28 is configured to send a control signal 36 to wiper motor 38 instructing wiper motor 38 to move wiper 42 at a rate based upon the tempo, such that the wiper moves synchronously with the tempo. Wiper control 28 typically adjusts the wiper motion by adjusting a delay and/or speed of the wiper, as discussed below.

Wiper control 28 typically includes a controller 29 linked to a memory 30. Typically controller 29 is a microcontroller and memory 30 is RAM, ROM, PROM, EEPROM, flash memory, etc. It will be appreciated that memory 30 may be situated within controller 29.

Memory 29 is configured to store user selected wiper settings 30*a* received from wiper setting input device 34, sync settings 30*b* received from sync control 35, and a tempo value 30*c* received from tempo detector 22. Wiper settings 30*a* typically include a delay setting and a speed setting. Sync settings 30*b* typically include an on/off setting and a permissible range of adjustment setting, discussed below.

User input device 34 is configured to enable a user to adjust wiper settings 30*a*. User input device 34 typically includes a speed control 34*a* and a delay control 34*b* respectively configured to adjust the speed setting and delay setting contained within wiper settings 30*a*.

Speed control 34*a* is typically a knob or slider configured to enable the user to set the wipers for intermittent operation, low speed, or high speed. Delay control 34*b* is typically a knob or slider configured to enable a user to select a desired delay setting for the intermittent operation mode. Alternatively, the wipers may be configured to operate according to other predetermined wiper settings. For example, the wipers may be configured to operate at a greater number of speed levels, or may include a continuously variable speed control. Alternatively other suitable controls may be provided to adjust the speed and delay settings.

System 10 also typically includes a sync control input device 35. Input device 35 typically includes a switch 35*a* configured to enable a user to turn on and off the synchronization feature of wiper control 28. Input device 35 also includes a range control 35*b*, such as a slider or knob, configured to enable a user to adjust the permissible range setting, within which the wiper control will attempt to adjust the rate of the wipers 42. Alternatively other suitable controls may be provided to turn on and off the synchronization and adjust the permissible range setting.

The permissible range is typically expressed as a percentage variance from user selected wiper setting 30*a* that the wiper control 28 may cause in the speed and/or delay of the wipers in order to synchronize the wipers with the tempo of audio signal 14. For example, the user may set via sync control 35 the wiper control 28 to attempt to synchronize the wipers to the tempo of the audio signal 14, provided that the speed and delay of the wipers is within 15% variance of the speed and delay settings set by the user in wiper settings 30*a*.

Figure 2:
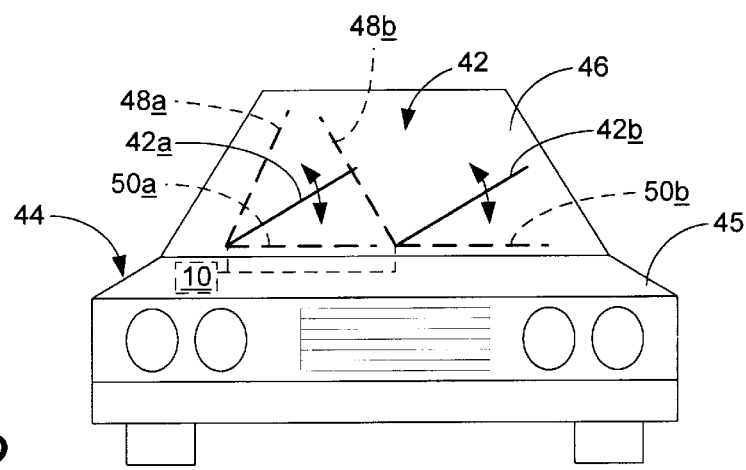
FIG. 2 is a front view of a vehicle according to one embodiment of the present invention in which the system of FIG. 1 is configured to operate.

As shown in FIG. 2, wipers 42, including passenger side wiper 42*a*, and driver side wiper 42*b*, are positioned on vehicle 44. Vehicle 44 is typically an automobile, but alternatively may be a boat, airplane, or other vehicle having wipers. Vehicle 44 includes vehicle body 45. Wipers 42*a*, 42*b* typically are positioned on a front windshield 46 of vehicle 44. Alternatively, wipers 42 may be positioned on a rear window, headlamps, or other area on vehicle 44.

Wipers 42*a*, 42*b* typically swing across windshield 46 between respective contracted positions 50*a* 50*b* and respective extended positions 48*a*, 48*b*. Positions 50*a*, 50*b*, 48*a*, 48*b* are also referred to as switchback positions, because the windshield wipers 42*a*, 42*b* change direction at these positions, emitting noise bursts in the process. The swath of wiper 42*a* usually intersects the swath of wiper 42*b* adjacent the extended position 48*b* in order to provide a continuous field of view to the driver and passengers. Contracted positions 50*a*, 50*b* may also referred to as horizontal positions 50*a* 50*b*. However, the contracted positions may not be horizontal. For example, a rear window wiper may have a contracted position that is angled upward.

Figure 3:
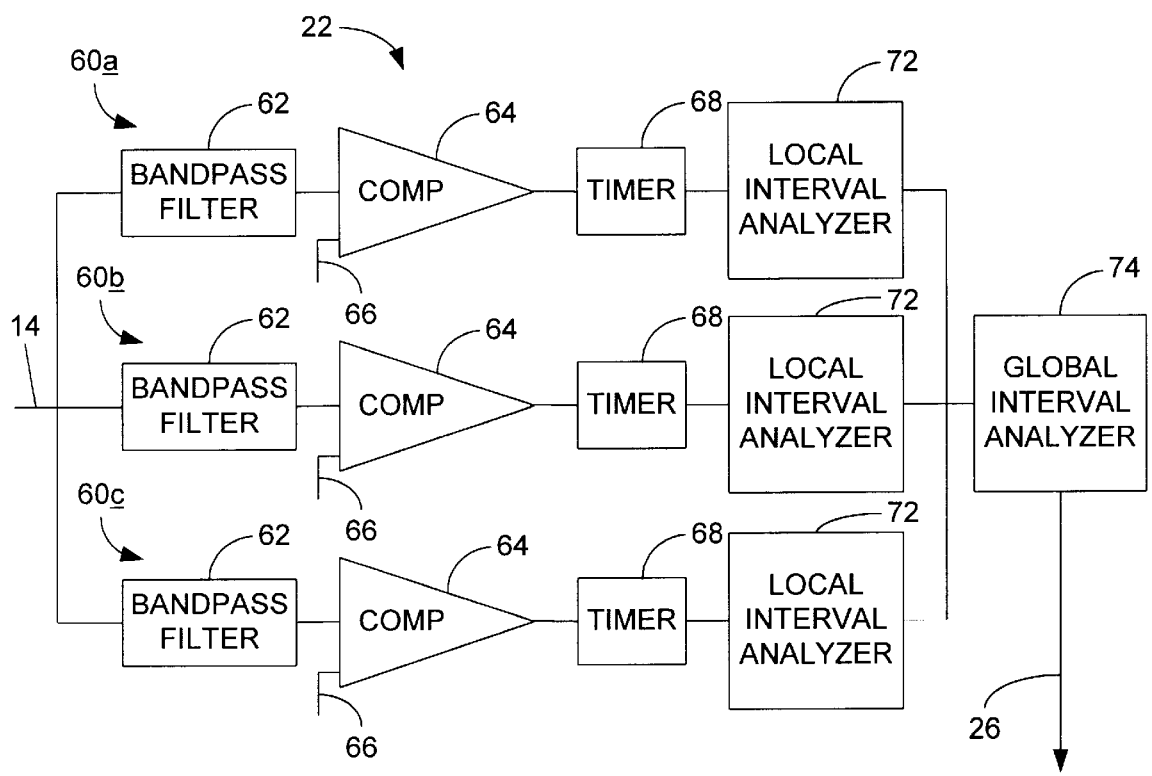
FIG. 3 is a schematic view of a tempo detector of the system of FIG. 1.

As shown in FIG. 3, tempo detector 22 typically includes a plurality of channels 60*a* 60*b*, and 60*c*, each configured with a bandpass filter 62 tuned to pass a respective frequency range from audio signal 14. The bandpass filters 62 typically are tuned to pass a portion of audio signal 14 corresponding to all or part of the frequency range of a different musical instrument. For example one bandpass filter may be configured to pass cymbals, and another may be configured to pass a bass guitar. Three channels are depicted, however more or fewer channels may be included.

Each channel further includes a comparator 64 configured to compare the passed frequency range from the corresponding bandpass filter with a threshold frequency 66. Each comparator periodically produces peak signals when the amplitude of the passed range of the audio signal 14 exceeds the threshold frequency 66.

Timer 68 is configured to time the interval between peak signals by starting a timer upon receiving a first peak signal from comparator 64 and stopping the timer upon receiving a second peak signal form comparator 64. Thus, timer 68 is configured to measure the amount of time between amplitude peaks in a predetermined frequency range of audio signal 14. Timer 68 passes the value of the measured time interval between peak signals to local interval analyzer 72.

Local interval analyzer 72 is configured to receive a plurality of local interval values from timer 68, and analyze the intervals to determine whether they fall within a common time signature. Typically, this is accomplished by first calculating whether the intervals are in a harmonic relationship with each other, and then calculating a local base harmonic value based upon the measured intervals.

Periodic waves are said to be in a harmonic relationship with each other if the frequencies of the waves are whole number multipliers of each other, such as waves with frequencies of 32, 16, 8, 4, 2, 1, ½, and ¼ cycles per second. The lower frequency of the two waves is referred to as a base or fundamental frequency, and the higher of the two waves is referred to as a harmonic frequency of the fundamental frequency. A periodic wave that has a frequency that is a fraction of the fundamental frequency of a fundamental wave is referred to as a subharmonic of the fundamental wave. Two waves are said to be in a harmonic relationship with each other whether one is a harmonic or subharmonic of the other. Thus, the motion of a wiper and detected tempo are herein described to be in a harmonic relationship with each other if the frequency of the wiper motion is a harmonic or subharmonic of the detected tempo. The waves need not be in phase, and the nodal points of the waves need not coincide, for the waves to be in a harmonic relationship.

The local base harmonic value calculated by the local interval analyzer is typically an interval value corresponding to the shortest interval of the group of local interval values. Alternatively, the local base harmonic value may be a frequency value corresponding to the shortest interval of the group of local intervals, the frequency being the inverse of the interval value. For example, if the local base harmonic values are intervals of ⅛, ½, ¼, and 1 second, the local interval analyzer will determine that (1) the intervals are in a harmonic relationship with each other, and (2) the local base harmonic value for these intervals is ⅛ of a second, which has a corresponding frequency of 8 cycles per second.

Tempo detector 22 also typically includes a global interval analyzer 74 configured to receive as input the various base harmonic values calculated by each local interval analyzer 72 for each channel 60a–60c. Global interval analyzer 74 is configured to analyze the various base harmonic values to determine whether they are in a common time signature. This is typically accomplished by determining whether the local base harmonic values are in a harmonic relationship with each other, described above. If so, the global interval analyzer typically calculates a global base harmonic value, which is typically the shortest interval among the group of local base harmonic values. Alternatively, the global base harmonic value may be a frequency value corresponding to the highest frequency among the local base harmonic values. For example, if the local interval analyzer 72 for each channel 60a–60c produces respective local base harmonic values that are intervals of ¼, 2 and ½ seconds, the global interval analyzer 74 will calculate a global base harmonic value of ¼ seconds (shortest interval), or 4 cycles per second (highest frequency).

The local and global interval analyzers typically also are configured to recognize syncopated music or swing music, and calculate local and global base harmonic values therefrom.

From the global base harmonic value, the global interval analyzer typically calculates a tempo to output in tempo signal 26. Typically, the tempo is expressed in beats per minute, although virtually any expression of tempo may be used. Global interval analyzer 74 typically takes 120 beats (or cycles) per minute (BPM) as a reference tempo, and calculates a BPM value nearest to 120 BPM that corresponds to the global base harmonic value. For example, if the global base harmonic value is 4 cycles per second, the calculated tempo will be 120 BPM (4×60=240BPM/2= 120BPM). If the global base harmonic value is 3 cycles per second, the calculated tempo will be 90 BPM (3×60= 180BPM/2=90BPM).

Figure 4:
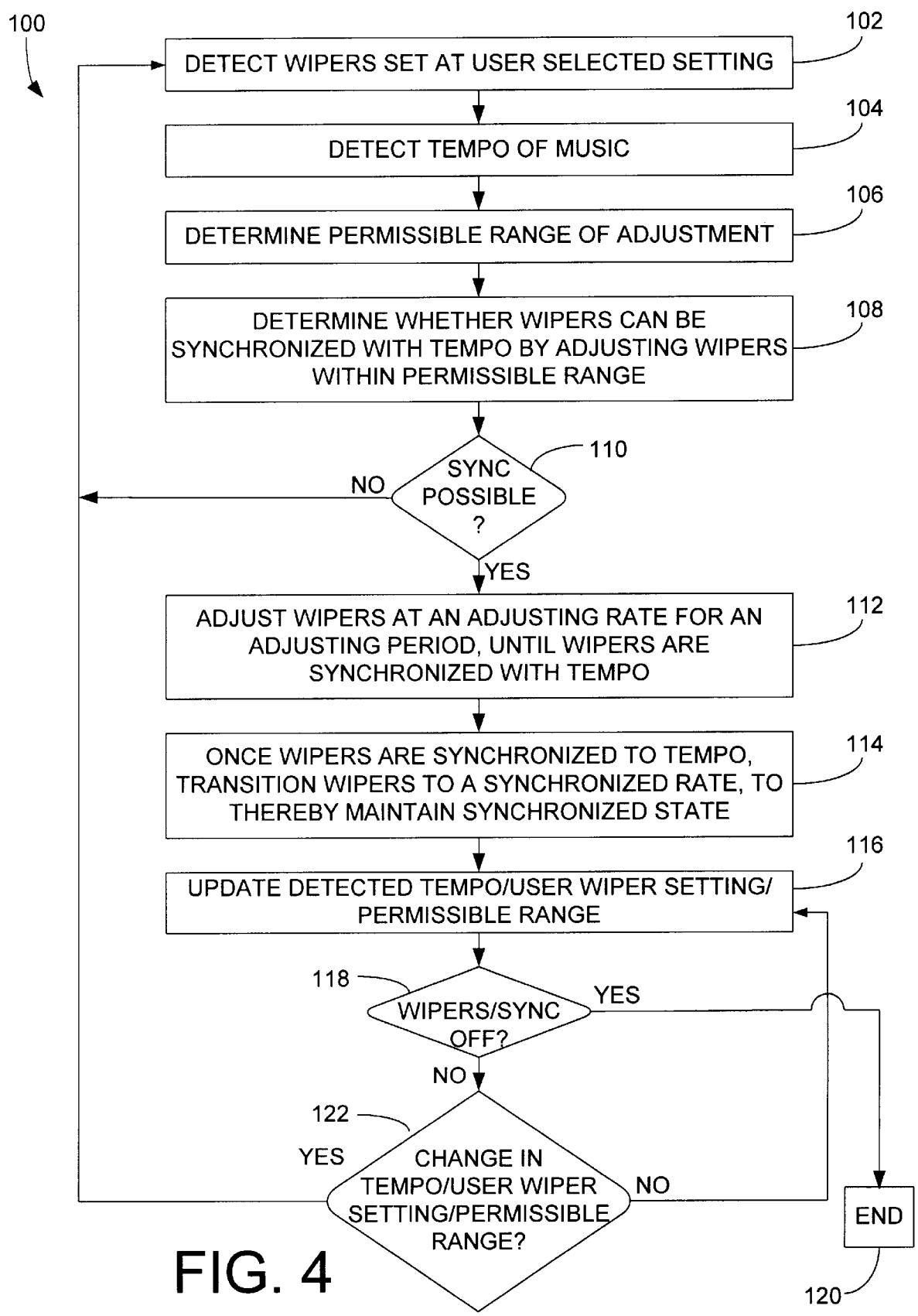
FIG. 4 is a flowchart of a method for syncluhonizing a vehicle wiper to an onboard audio signal.

In FIG. 4, a method for synchronizing a wiper to an audio signal according to one embodiment of the present invention is shown generally at 100. Method 100 typically includes, at 102, detecting that a windshield wiper is set at a user selected wiper setting 30, which typically includes a speed setting and/or delay setting, as described above. At 104, the method typically includes detecting a tempo of music via tempo detector 22, as described above.

At 106, the method typically includes determining a permissible range of adjustment for the windshield wipers. The permissible range typically includes a permissible range of wiper speed adjustment, and a permissible range of delay adjustment. Typically, the permissible range is deteimined by examining user input from a range control 35b sync control input device 35. Alternatively, the permissible range may be predetermined, and stored within wiper control 28. The predetermined permissible range may vary depending the speed/delay setting of the wipers 42.

At 108, the method includes determining whether wipers 42 can be synchronized with the tempo by adjusting the wipers within the permissible range. Typically, this is accomplished by calculating the amount of delay adjustment and/or speed adjustment necessary to synchronize the wipers with the detected tempo, and determining whether the necessary amount of adjustment is within the permissible range. At 110, if synchronization is not possible, the method returns to 102.

If synchronization is possible the method proceeds from 110 to 112. At 112, the method includes adjusting the wipers at an adjustment rate for an adjustment period, until the wipers are synchronized with the tempo. The adjustment rate may include variations in speed and/or delay of the wipers.

The wipers are referred to herein as "synchronized" when the frequency of the periodic wiper motion is in a harmonic relationship with the tempo of the music. While synchronized, the wipers may move, for example, in double time (twice the frequency of the tempo of the music), triple time (three times the frequency of the tempo of the music), or half time (half the frequency of the tempo of the music), or at virtually any other frequency that is in a harmonic relationship with the tempo of the music.

The wipers are referred to herein as "in phase" with the music when the wipers reach a switchback "on the beat" of the tempo of the music. This condition alternatively may be referred to as "aligned at one switchback." When both switchbacks (e.g. 48a, 50a) in a wiper motion cycle coincide with the beat of the tempo, the wipers are referred to herein as "aligned at both switchbacks." While typically the wipers are adjusted at 112 until they are synchronized with the tempo, alternatively, the wipers may be adjusted at 112 until they are aligned at one or both switchbacks.

Typically, the wiper control 28 first attempts to adjust the wipers to be aligned at both switchbacks, if possible by adjustment within the permissible range for speed and delay adjustment. If not possible, the wiper control 28 attempts to adjust the wipers to be aligned at one switchback. Finally, if alignment at one switchback is not possible within the permissible range, then the wiper control attempts to synchronize the wipers by changing the period and frequency of the wiper motion to be a harmonic of the tempo.

At 114, the method typically includes, once the wipers are synchronized to the tempo, transitioning the wipers from the adjustment rate to a synchronized rate, to thereby maintain the wipers in a synchronized state with the tempo of the music. The synchronized rate may be reached by valying the speed and/or delay of the wipers from the adjustment rate. The wipers remain in motion at the synchronized rate for a synchronized period, which may be until the tempo or permissible range changes, or the wipers or synchronization feature are turned off.

At 116, the method typically further includes updating the detected tempo, user wiper setting, and permissible range, by receiving input from tempo detector 22, wiper setting input device 34, and sync input device 35, respectively. At 118, if either the wipers 42 or synchronization finction is turned off by the user, the method proceeds to end at 120. At 122, if the wiper control 28 detects a change in the tempo, user wiper setting, or permissible range, then the method proceeds to repeat at 102. If no change is detected, the method continues in a loop to 116 to update the tempo, user wiper setting, and permissible range.

Figure 5:
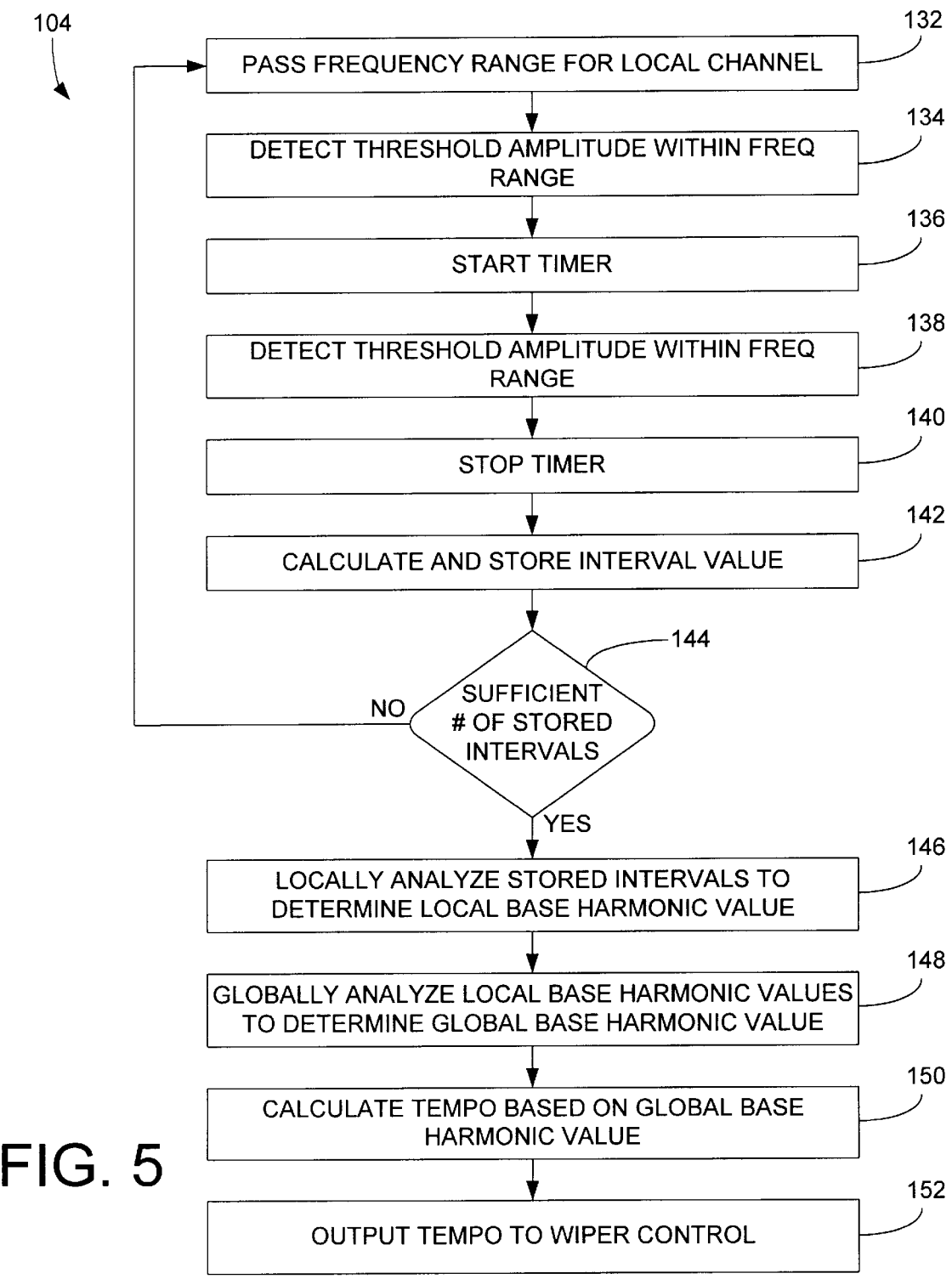
FIG. 5 is a flowchart of a method for detecting a tempo from an audio signal.

In FIG. 5, a method for detecting tempo at step 104 is shown in detail. Step 104 is usually implemented using the tempo detector 22, described above. Detecting tempo at step 104 typically includes, at 132, passing a frequency range through a bandpass filter 62. The frequency range is typically tuned to a particular instrument, such as cymbals or bass guitar. At 134, the method includes detecting a first threshold amplitude within the frequency range, typically via comparator 64, as described above.

Once the threshold amplitude is detected at 134, the method further includes, at 136, starting timer 64. At 138, the method includes detecting a second threshold amplitude within the frequency range, again via comparator 64. At 140, the method includes stopping the timer once the second threshold is detected. At 142, the method includes calculating and storing an interval value corresponding to the time interval between the threshold peaks. Typically the interval value is stored in local interval analyzer 72, described above.

At 144, the method includes determining whether there are a sufficient number of stored intervals in the local interval analyzer. Typically, four intervals are stored for comparison, and steps 132–142 are repeated four times. Alternatively, a larger or smaller number of intervals may be stored. For example, seven intervals may be stored, or only one interval may be stored. If a sufficient number of intervals are not yet stored, the method loops back to 132 to measure another interval.

If a sufficient number of intervals are stored, the method includes, at 146, locally lW analyzing the stored intervals to determine a local base harmonic value for the intervals. This is typically accomplished by the process described above. Steps 132–146 may be repeated for each of a plurality of channels 60a–60c tuned to different frequency ranges.

At 148, the method may also include globally analyzing the local base harmonic values calculated for each of the channels, and calculating a global base harmonic value, as described above. At 150, the method includes calculating a tempo based on the global base harmonic value, as described above. At 152, the method includes outputting the tempo in a tempo signal 26 to the wiper control 28. The tempo is typically expressed in beats per minute. Alternatively, another scale suitable to express tempo may be used.

According to another embodiment of the invention, the audio source 12 may be configured to output a tempo signal 26a directly to the wiper control 28, and system 10 may not include a tempo detector 22. In this embodiment of the invention, the tempo of the current song is encoded on CD 16, or within broadcast signal 22. This tempo is decoded by audio source 12 and transmitted as tempo signal 26a to wiper control 28.

It will also be appreciated that the tempo detector 22 may be constructed as part of the audio source 12. According to this embodiment of the invention, the audio source 12 is configured to output both audio signal 14 and tempo signal 26.

Figure 6:
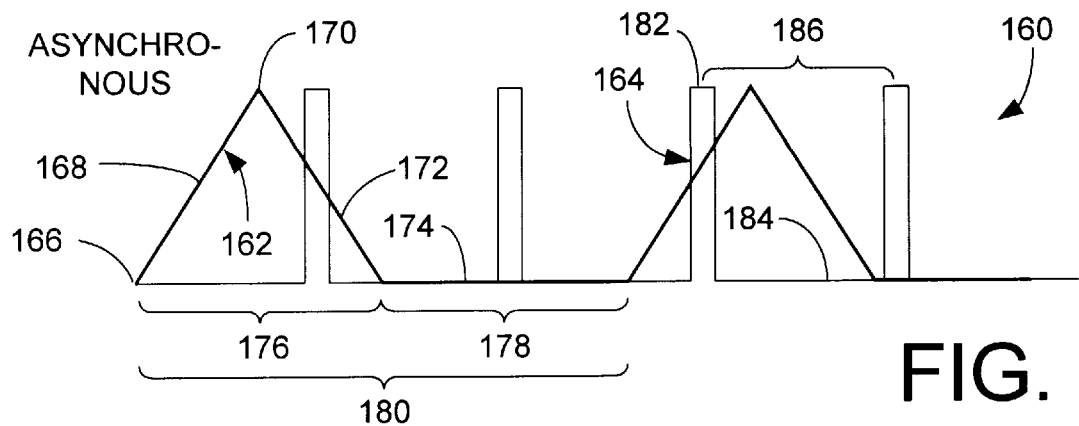
FIG. 6 is a graph of a wiper motion waveform and an audio signal tempo waveform in an asynchronous configuration.

FIG. 6 shows an asynchronous configuration 160 of a wiper motion waveform 162 and a tempo waveform 164. For both wavefoirm 162 and waveform 164, the x-axis represents time. For wiper motion waveform 162, the y-axis represents degrees of rotation for wiper. For tempo waveform 164, the y-axis represents amplitude.

Wiper motion waveform 162 depicts periodic movement of a wiper from the contracted position 50a to the extended position 48a and back. While wiper motion waveform 162 may be used to describe the motion of wiper 42a or 42b or virtually any other wiper 42, wiper motion waveform 162 will be described for the sake of brevity only in relation to wiper 42a.

Moving from left to right, wiper motion waveform 162 includes an origin 166 corresponding to a wiper position of 50a. Wiper motion waveform 162 finther includes an upward slope 168 corresponding to wiper movement from contracted position 50a to extended position 48a. The slope of line 168 indicates the speed at which the wiper is being rotated across windshield 46, with the greater the slope, the greater the speed.

Wiper motion waveform 162 further includes a peak 170 corresponding to wiper 42a in extended position 48a. Peak 170 is typically curved, because the wiper slows down before reversing direction at switchback 48a, however for simplicity peak 170 is shown with a sharp angle. Wiper motion waveform 162 also includes a downward slope 172 corresponding to wiper 42a moving from extended position 48a to contracted position 50a. Wiper motion waveform 162 also includes a trough 174 corresponding to wiper 42a in contracted position 50a. While slopes 168, 172 are depicted as constant, it will be understood that slopes 168, 172 may be curved or polygonal, and that the rotational speed of the windshield may vary throughout the wiping cycle. In addition, the intersections between trough 174 and slopes 172 and 168 are typically curved, but are depicted as sharp angles for simplicity.

Waveform sections 166–172 are collectively referred to as a wiper movement portion 176 of waveform 162. Wiper motion waveform 162 further includes a delay portion 178, during which wiper 42a remains in contracted position 50a. The period of wiper motion waveform 162 is shown at 180.

Tempo waveform 164 includes peaks 182 representing "beats" of audio signal 14. Tempo waveform 164 also includes troughs 184 in between peaks 182. The period of tempo waveform 164 is shown at 186.

To synchronize the motion of the wiper with the tempo of audio signal 14, the wiper controller 28 is configured to signal wiper motor 38 to alter the wiper motion and rate.

This is accomplished by adjusting the speed and/or delay of the wiper, thereby affecting the wiper movement portion 176 and/or delay portion 178 of the wiper motion waveform 162.

Figure 7:
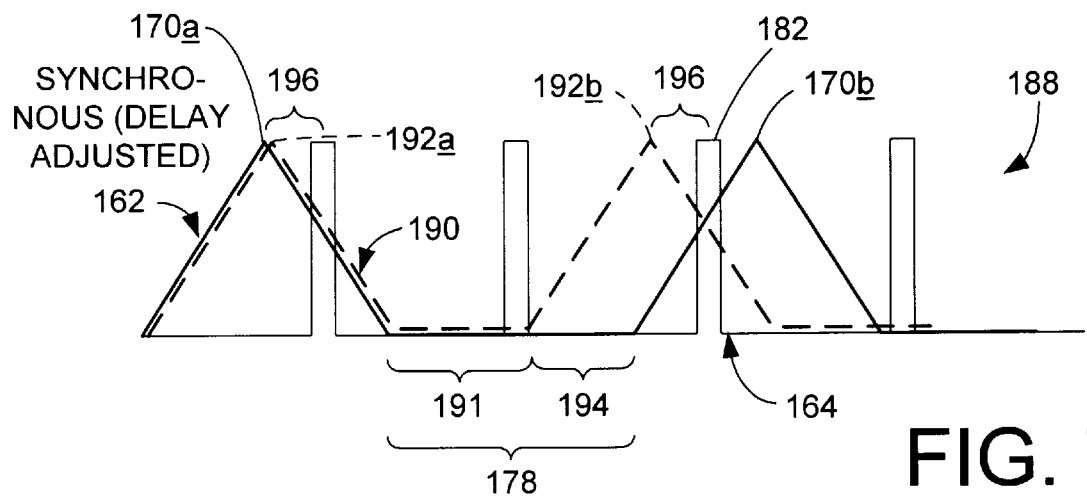
FIG. 7 is a graph of a wiper motion waveform and an audio signal tempo waveform in a synchronous configuration, wherein the delay of the wiper motion is adjusted.

One example of a method by which wiper control 28 is configured to synchronize wiper motion with the tempo of audio signal 14 is illustrated in FIG. 7. In FIG. 7, the wiper motion waveform 190 and tempo waveform 164 are shown in a synchronized configuration 188. The synchronization has been achieved by adjusting the delay portion 178 of pre-adjustrnent waveform 162, by shortening delay portion 178 by an adjustment interval 194 to form delay portion 191 of post-adjustment wiper motion waveform 190.

After adjustment, peak 170a of pre-adjustrnent waveform 162 is aligned with peak 192a of post-adjustment waveform 190, however peak 192b is shifted to the left from peak 170b, such that it occurs earlier in time. Peaks 192a and 192b occur at a fixed interval 196 relative to peaks 182. Post-adjustment wiper motion waveform 190 has twice as long a period as tempo waveform 164. Therefore, the post-adjustment wiper motion waveform 190 and the tempo waveform 164 are in a harmonic relationship, and are thus synchronized.

It will be understood that while FIG. 7 illustrates decreasing the delay portion 178 of wiper motion waveform 162, the wiper control 28 may also be configured to lengthen the delay portion to synchronize the wiper motion with the tempo. Further, it will be understood that wiper control 28 typically is configured to determine whether the adjustment interval 194 necessary for bringing the wiper motion waveform 162 into synchronization with the tempo waveform 164, is within the permissible range of adjustment, discussed above. Only after determining that the adjustment interval 194 is within the permissible range, will the wiper control 28 signal the wiper motor to adjust the wiper motion. It will be understood that the wiper control typically incrementally adjusts the wiper motion waveform from an asynchronous state a synchronous state. Therefore it may take several cycles of the wipers to adjust the wiper motion from a pre-adjustment to post-adjustment state.

Figure 8:
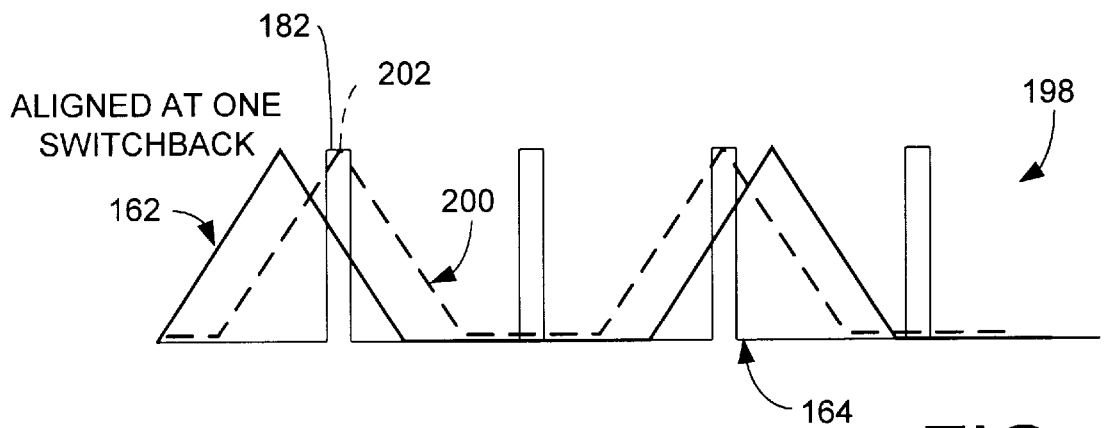
FIG. 8 is a graph of a wiper motion waveform and an audio signal tempo waveform in a synchronous configuration, aligned at one switchback.

FIG. 8 illustrates another synchronized configuration 198 of wiper motion waveform 200 and tempo waveform 182, in which the wiper motion waveform 200 has been aligned at one switchback 48a. Typically, wiper control 28 is configured to attempt to adjust the wipers to align the switchbacks 48a, 48b with the beat of the tempo waveform, provided alignment can be accomplished by adjustment of wiper motion within the permissible range. In FIG. 8, wiper motion waveform 200 is shown aligned only at one switchback. This has been accomplished by phase shifting the wiper motion waveform from the position shown at 190 in FIG. 7 to the position shown at 200, such that peak 202 aligns with peak 182 of tempo waveform 164.

Figure 9:
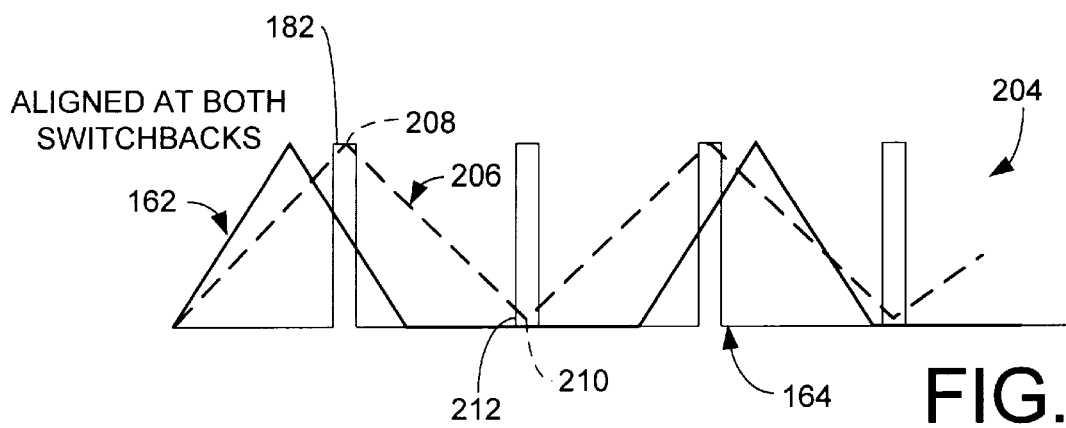
FIG. 9 is a graph of a wiper motion waveform and an audio signal tempo waveform in a synchronous configuration, aligned at both switchbacks.

FIG. 9 illustrates another synchronized configuration 204 into which wiper control 28 is configured to adjust wiper motion waveform 162. In configuration 204, post-adjustment wiper motion waveform 206 and tempo waveform 164 are aligned at both switchbacks 48a and 50a. To accomplish this, wiper control 28 is configured to adjust the speed of the wiper 42a, such that peak 208 of post-adjustment wiper motion waveform 206 coincides temporally with peak 182 of tempo waveform 164. The speed of the wiper 42a is adjusted such that trough 210 of post-adjustment wiper motion waveform 206 coincides temporally with peak 212 of tempo waveform 164. In this way the wiper reverses motion at each switchback 48a, 50a substantially on the beat.

Typically, the speed of wiper motor 38 is continuously variable. Wiper control 28 controls the speed of wiper motor 38 to adjust the speed of the wiper. Alternatively, wiper motor 38 may have only one speed, or two or more speeds, and the wiper control may set the speed of the wiper motor. In addition, system 10 may include a mechanical transmission, and wiper control may adjust the speed of the wiper by adjusting the speed ratio of the transmission.

Figure 10:
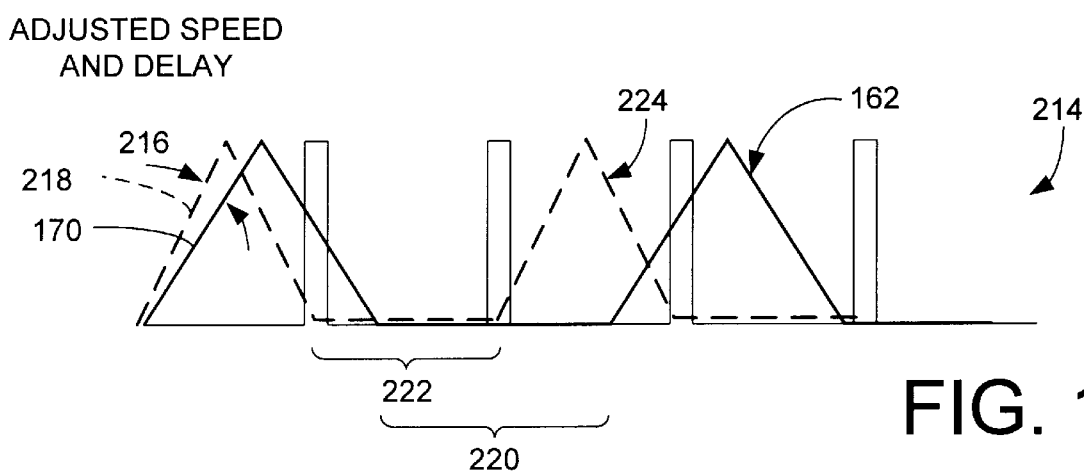
FIG. 10 is a graph of a wiper motion waveform and an audio signal tempo waveform in a synchronous configuration, wherein the speed and delay of the wiper motion are adjusted.

In FIG. 10, a synchronized configuration 214 is shown in which wiper control 28 has adjusted both the speed and delay of the wiper motion. The speed has been adjusted as indicated at 216. Upward slope 170 has been increased to the slope shown at 218, and a corresponding change in speed has occulTed in the downward slope as well. In addition, the delay portion 220 of the pre-adjustment wiper motion waveform 162 has been shortened to the delay portion 222 of post-adjustment wiper motion waveform 224. While the speed is shown as increased and the delay portion as decreased in FIG. 10, it will be appreciated that the wiper control 28 may be configured to adjust the motion of the wipers by decreasing the speed and/or increasing the delay portion as well.

According to another aspect of the invention, a vehicle 44 is provided, as shown in FIG. 2. The vehicle includes a vehicle body 45 including a windshield 46, and at least one wiper 42 positioned adjacent the windshield. The vehicle typically includes system 10, described above, mounted thereto. Wiper motor 38 is configured to move the wiper 42 relative to the windshield 46. Audio source 12, tempo detector 22, and wiper control 28 are typically coupled to the vehicle body 45. As described above, the audio source 12 is configured to produce an audio signal 14, and the tempo detector is configured to detect a tempo from the audio signal. The wiper control 28 is configured to receive a tempo from audio signal 14 and signal the wiper motor 38 to move the wipers based upon the detected tempo, as described above.

While the present invention has been particularly shown and described with reference to the foregoing preferred embodiments, those skilled in the art will understand that many variations may be made therein without departing from the spirit and scope of the invention as defmed in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A method for synchronizing a vehicle wiper to an onboard audio signal, the method comprising:
   detecting a tempo of the audio signal; and
   moving the wiper based on the detected tempo of the audio signal.

2. The method of claim 1, wherein moving the wiper includes moving the wiper at a frequency that is in a harmonic relationship with the detected tempo.

3. The method of claim 1, wherein moving the wiper includes moving the wiper at a first rate for an adjustment period until movement of the wiper is synchronized with the detected tempo.

4. The method of claim 3, wherein moving the wiper includes moving the wiper at a second rate during a synchronized period once the wiper is synchronized to the tempo.

5. The method of claim 1, wherein moving the wiper includes adjusting a speed of the wiper to synchronize the wiper motion with the tempo.

6. The method of claim 1, wherein moving the wiper includes adjusting a delay of the wiper to synchronize the wiper motion with the tempo.

7. The method of claim 1, wherein moving the wiper includes adjusting a phase of the wiper to synchronize the wiper motion with the tempo.

8. The method of claim 1, wherein moving the wiper includes adjusting the wiper motion such that at least one wiper switchback occurs substantially on a beat of the audio signal.

9. The method of claim 8, wherein moving the wiper includes adjusting the wiper motion such that both wiper switchbacks occur substantially on a beat of the audio signal.

10. The method of claim 1, wherein detecting the tempo includes filtering the audio signal for a particular frequency range.

11. The method of claim 1, wherein detecting the tempo includes detecting peaks in the amplitude of the audio signal.

12. The method of claim 1, wherein detecting the tempo includes detecting a tempo code emitted by a source of the audio signal.

13. The method of claim 1, further comprising determining a permissible range within which movement of the wiper may be adjusted to synchronize the wiper motion to the tempo.

14. The method of claim 13, wherein the permissible range is adjustable via a sync control input device.

15. The method of claim 13, wherein the permissible range includes a permissible speed range.

16. The method of claim 13, wherein the peimissible range includes a permissible delay range.

17. A method for synchronizing a vehicle wiper to an onboard audio signal, the method comprising:

detecting a tempo of the audio signal;

moving the wiper at a first rate for an adjustment period, until movement of the wiper is synchronized with the tempo of the audio signal; and moving the wiper at a second rate for a synchronized period such that the wiper remains synchronized with the tempo of the audio signal;

wherein the first and second rates are achieved by adjusting at least one parameter of wiper motion selected from the group consisting of wiper speed and wiper delay.

18. A system for use in synchronizing a vehicle wiper to an onboard audio signal, the system comprising:

an audio source configured to generate an audio signal;

a wiper control coupled to the audio source;

a wiper motor linked to the wiper control, the wiper motor being configured to rotate the vehicle wiper;

wherein the wiper control is configured to receive a tempo of the audio signal and signal the wiper motor to move the wiper based upon the tempo.

19. The system of claim 18, further comprising a tempo detector coupled to the audio source and to the wiper control, the tempo detector being configured to detect the tempo from the audio signal and output the tempo to the wiper control.

20. The system of claim 19, further comprising a sync control input device configured to receive input from a user corresponding to a permissible range of adjustment and output the permissible range to the wiper control.

21. A vehicle, comprising:

a vehicle body including a windshield;

at least one wiper positioned adjacent the windshield;

a wiper motor configured to move the wiper relative to the windshield;

an audio source coupled to the body, the audio source being configured to produce an audio signal; and a wiper control configured to receive a tempo of the audio signal and signal the wiper motor to move the wiper based upon the tempo.

* * * * *